(12) United States Patent
Anbarasan et al.

(10) Patent No.: US 8,661,095 B2
(45) Date of Patent: Feb. 25, 2014

(54) IDENTIFYING SCRIPTING FORM OF TEXT COMMANDS FOR A NETWORK DEVICE

(75) Inventors: Arockia Anbarasan, Thanjavur (IN); Philip A. Shafer, Raleigh, NC (US)

(73) Assignee: Juniper Networks, Inc., Sunnyvale, CA (US)

( * ) Notice: Subject to any disclaimer, the term of this patent is extended or adjusted under 35 U.S.C. 154(b) by 208 days.

(21) Appl. No.: 13/211,556

(22) Filed: Aug. 17, 2011

(65) Prior Publication Data
US 2012/0303758 A1   Nov. 29, 2012

(30) Foreign Application Priority Data
May 25, 2011   (IN) .............................. 1776/CHE/2011

(51) Int. Cl.
*G06F 15/16*   (2006.01)
(52) U.S. Cl.
USPC .......................................... 709/218; 709/223
(58) Field of Classification Search
USPC ................................. 709/218, 217, 221, 223
See application file for complete search history.

(56) References Cited

U.S. PATENT DOCUMENTS

| 7,363,351 | B1 * | 4/2008 | Shafer ........................... 709/217 |
| 2001/0051961 | A1 * | 12/2001 | Duxbury ........................ 707/517 |
| 2011/0022608 | A1 * | 1/2011 | Jalobeanu et al. ............ 707/754 |

OTHER PUBLICATIONS

Harrington et al. "An Architecture for Describing Simple Network Management Protocol (SNMP) Management Frameworks," RFC 3411, Network Working Group, The Internet Society, Dec. 2002, p. 1-65.
Enns, R. Ed. "NETCONF Configuration Protocol," RFC 4741, Network Working Group, The IETF Trust, Dec. 2006, p. 1-96.
"Configuration and Operations Automation Guide," Junos OS 10.4, Juniper Networks, Inc., Oct. 8, 2010, p. 1-516.
"NETCONF XML Management Protocol Guide," Junos OS 10.4, Juniper Networks, Inc., Oct. 6, 2010, p. 1-188.
"Junos XML Management Protocol Guide" Junos OS 10.4, Juniper Networks, Inc., Oct. 19, 2010, p. 1-282.

* cited by examiner

*Primary Examiner* — El Hadji Sall
(74) *Attorney, Agent, or Firm* — Shumaker & Sieffert, P.A.

(57) ABSTRACT

In one example, a device includes a network interface configured to present a command interface to receive input comprising a command and an indicator, wherein the command conforms to an execution format and specifies one or more parameters to be applied during execution of the command, and wherein the indicator indicates, at least in part, that the command is not to be executed, and a control unit configured to reformat, based on the indicator, the command to conform to an extensible markup language (XML) format such that the reformatted command complies with a syntax supported by a script processing module of the network device and specifies the command and the one or more parameters in the XML format in a format that can be executed by the script processing module, and to output the reformatted command via the command interface. Thus, the device may provide XML formatted equivalents for commands.

20 Claims, 5 Drawing Sheets

US 8,661,095 B2

IDENTIFYING SCRIPTING FORM OF TEXT COMMANDS FOR A NETWORK DEVICE

TECHNICAL FIELD

This disclosure relates to computer networks, and more particularly, to interfaces for interacting with devices within computer networks.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

In some cases a network device may provide multiple management interfaces of different types. For example, a network device may support a management interface that presents a command line interface by which a client can enter text-based commands to be applied by the network device. As another example, the network device may provide a management interface that by which the commands and configuration data may be specified in accordance with a data description language, such as the extensible markup language (XML). Examples of such interfaces include interfaces that support the Network Configuration (NETCONF) protocol, or a derivative thereof, such as the Juniper Device Management Interface, to perform the configuration. Such interfaces may be useful for computer-driven clients, such as automated scripts or network management systems. Further information on the NETCONF protocol is described in R. Enns et al., RFC 4741: "NETCONF Configuration Protocol," Network Working Group, the Internet Engineering Task Force draft, December 2006, available at http://tools.ietf.org/html/rfc4741, which is hereby incorporated herein by reference in its entirety.

SUMMARY

In general, this disclosure describes techniques for assisting a user in construction of scripting formats for commands, such as extensible markup language (XML)-based scripts, from text-based commands submitted in an execution format. The user may submit the command to a managed network device via a command line interface (CLI) along with an indicator within the command string that the command is not to be executed, but is instead to be reformatted into an XML-equivalent script. The command may include operational parameters (e.g., arguments) that normally would be applied during execution of the command, and the reformatted XML equivalent script may also specify these parameters and the values attributed to them as entered by the user. In this manner, the user may enter a native command into, e.g., the CLI of a remote network device in order to quickly obtain an XML equivalent version of the command, without the necessity to consult a large instructional document that describes the XML commands.

In one example, a method includes receiving, via a command interface of a network device, input comprising a command and an indicator, wherein the command conforms to an execution format and specifies one or more parameters to be applied during execution of the command, and wherein the indicator indicates, at least in part, that the command is not to be executed by the network device, based on the indicator, reformatting, by the network device, the command to conform to an extensible markup language (XML) format such that the reformatted command complies with a syntax supported by a script processing module of the network device and specifies the command and the one or more parameters in the XML format in a format that can be executed by the script processing module, and outputting the reformatted command.

In another example, a device includes a network interface configured to present a command interface to receive input comprising a command and an indicator, wherein the command conforms to an execution format and specifies one or more parameters to be applied during execution of the command, and wherein the indicator indicates, at least in part, that the command is not to be executed, and a control unit configured to reformat, based on the indicator, the command to conform to an extensible markup language (XML) format such that the reformatted command complies with a syntax supported by a script processing module of the network device and specifies the command and the one or more parameters in the XML format in a format that can be executed by the script processing module, and to output the reformatted command via the command interface.

In another example, a system includes a plurality of network elements, and a management device configured to manage each of the plurality of network elements. Each of the plurality of network elements in this example includes a network interface configured to present a command interface to receive, from the management device, input comprising a command and an indicator, wherein the command conforms to an execution format and specifies one or more parameters to be applied during execution of the command, and wherein the indicator indicates, at least in part, that the command is not to be executed, and a control unit configured to reformat, based on the indicator, the command to conform to an extensible markup language (XML) format such that the reformatted command complies with a syntax supported by a script processing module of the network device and specifies the command and the one or more parameters in the XML format in a format that can be executed by the script processing module, and to output the reformatted command via the command interface.

In another example, a computer-readable storage medium comprises instructions that, when executed, cause a processor to receive, via a command interface executed by the processor, input comprising a command and an indicator, wherein the command conforms to an execution format and specifies one or more parameters to be applied during execution of the command, and wherein the indicator indicates, at least in part, that the command is not to be executed, based on the indicator, reformat the command to conform to an extensible markup language (XML) format such that the reformatted command complies with a syntax supported by a script processing module of the network device and specifies the command and the one or more parameters in the XML format in a format that can be executed by the script processing module, and output the reformatted command.

The details of one or more examples are set forth in the accompanying drawings and the description below. Other features, objects, and advantages will be apparent from the description and drawings, and from the claims.

DETAILED DESCRIPTION

Figure 1:
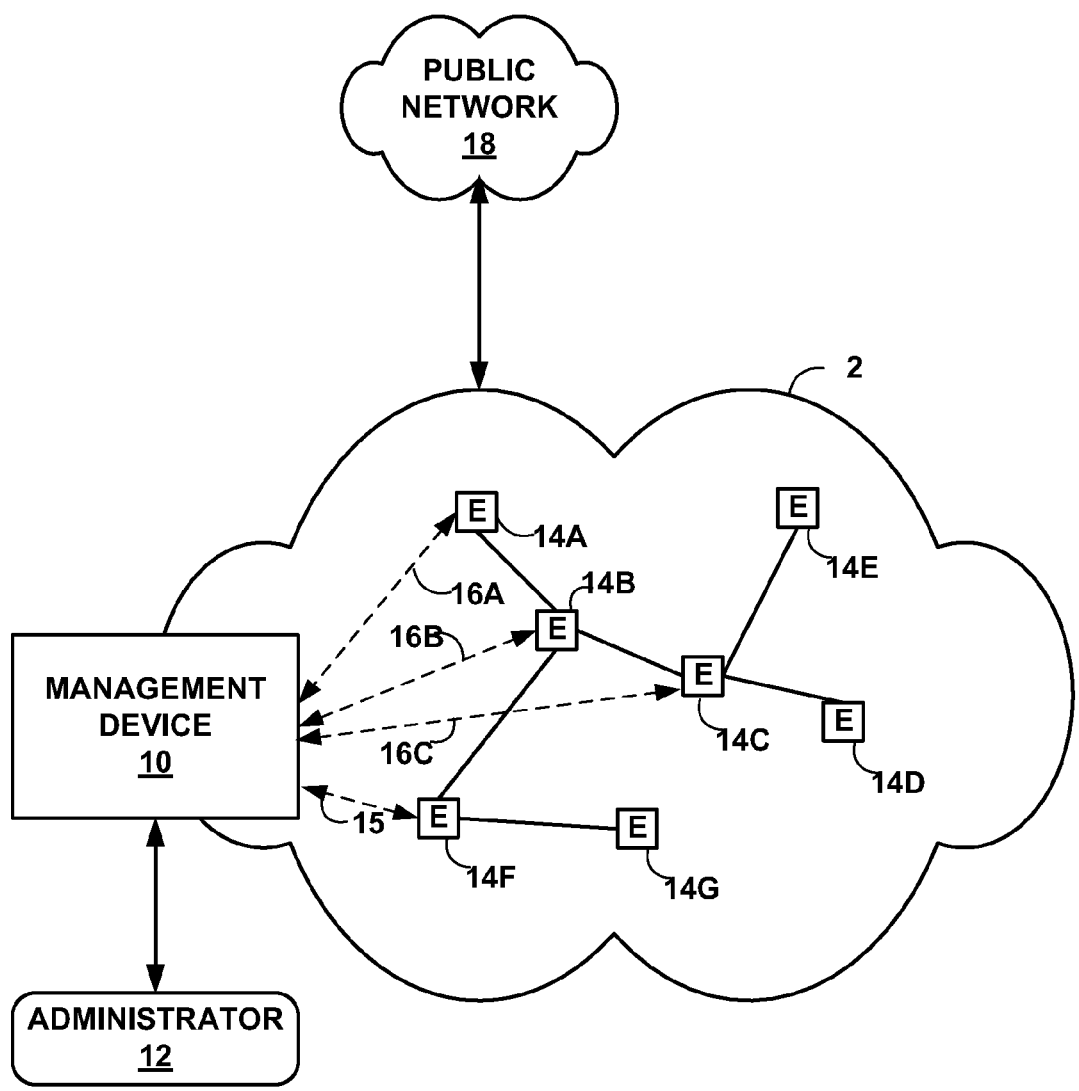
FIG. 1 is a block diagram illustrating an example including elements of an enterprise network that are managed using a management device.

FIG. 1 is a block diagram illustrating an example including elements of an enterprise network 2 that are managed using a management device 10. Managed elements 14A-14G (collectively, "elements 14") of enterprise network 2 include network devices interconnected via communication links to form a communication topology in order to exchange resources and information. Elements 14 (also generally referred to as network devices or remote network devices) may include, for example, routers, switches, gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, enterprise network 2 may transmit data according to any other discrete data unit defined by any other protocol, such as a cell defined by the Asynchronous Transfer Mode (ATM) protocol, or a datagram defined by the User Datagram Protocol (UDP). Communication links interconnecting elements 14 may be physical links (e.g., optical, copper, and the like), wireless, or any combination thereof.

Enterprise network 2 is shown coupled to public network 18 (e.g., the Internet) via a communication link. Public network 18 may include, for example, one or more client computing devices. Public network 18 may provide access to web servers, application servers, public databases, media servers, end-user devices, and other types of network resource devices and content.

Management device 10 is communicatively coupled to elements 14 via enterprise network 2. Management device 10, in some examples, forms part of a device management system, although only one device of the device management system is illustrated for purpose of example in FIG. 1. Management device 10 may be coupled either directly or indirectly to the various elements 14. Once elements 14 are deployed and activated, administrator 12 uses management device 10 to manage the network devices using a device management protocol. One example device protocol is the Simple Network Management Protocol (SNMP) that allows management device 10 to traverse and modify management information bases (MIBs) that store configuration data within each of managed elements 14. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference.

In common practice, management device 10, also referred to as network management system (NMS), and elements 14 are centrally maintained by an IT group of the enterprise. Administrator 12 interacts with management device 10 to remotely monitor and configure elements 14. For example, administrator 12 may receive alerts from management device 10 regarding any of elements 14, view configuration data of elements 14, modify the configurations data of elements 14, add new network devices to enterprise network 2, remove existing network devices from enterprise network 2, or otherwise manipulate the enterprise network 2 and network devices therein. Although described with respect to an enterprise network, the techniques of this disclosure are applicable to other network types, public and private, including LANs, VLANs, VPNs, and the like.

In some examples, administrator 12 uses management device 10 or a local workstation to interact directly with elements 14, e.g., through telnet, secure shell (SSH), or other such communication sessions. That is, elements 14 generally provide interfaces for direct interaction, such as command line interfaces (CLIs), web-based interfaces, graphical user interfaces (GUIs), or the like, by which a user can interact with the devices to directly issue text-based commands. For example, these interfaces typically allow a user to interact directly with the device, e.g., through a telnet, secure shell (SSH), hypertext transfer protocol (HTTP), or other network session, to enter text in accordance with a defined syntax to submit commands to the managed element. In some examples, the user initiates an SSH session 15 with one of elements 14, e.g., element 14F, using management device 10, to directly configure element 14F. In this manner, a user can provide commands in a format for execution directly to elements 14.

Further, administrator 12 can also create scripts that can be submitted by management device 10 to any or all of elements 14. For example, in addition to a CLI interface, elements 14 also provide interfaces for receiving scripts that specify the commands in accordance with a scripting language. In a sense, the scripts may be output by management device 10 to automatically invoke corresponding remote procedure calls (RPCs) on the managed elements 14. The scripts may conform to, e.g., extensible markup language (XML) or another data description language.

Administrator 12 uses management device 10 to configure elements 14 to specify certain operational characteristics that further the objectives of administrator 12. For example, administrator 12 may specify for an element 14 a particular operational policy regarding security, device accessibility, traffic engineering, quality of service (QoS), network address translation (NAT), packet filtering, packet forwarding, rate limiting, or other policies. Management device 10 uses a network management protocol designed for management of configuration data within managed network elements 14, such as the SNMP protocol or the Network Configuration Protocol (NETCONF) protocol or a derivative thereof, such as the Juniper Device Management Interface, to perform the configuration. In general, NETCONF provides mechanisms for configuring network devices and uses an Extensible Markup Language (XML)-based data encoding for configuration data, which may include policy data. NETCONF is described in RFC 4741, as indicated above. Management device 10 may establish NETCONF sessions with one or more of elements 14. In the example of FIG. 1, management device 10 participates in NETCONF sessions 16A-16C with elements 14A-14C, respectively, to provide commands and receive operational data in an automated fashion using a scripting language.

The techniques of this disclosure are directed to assisting a user, such as administrator 12, in the creation of the scripts to be sent to elements 14. In accordance with the techniques of this disclosure, one or more of elements 14 are configured to translate a command formatted and submitted for immediate execution via a command line interface of a network device 14 into an XML format that can be incorporated into a script an submitted via scripting interfaces of elements 14. In this manner, the techniques of this disclosure can be used to assist a user in construction of configuration and operation scripts using management device 10, where the scripts can later be sent to and executed by elements 14.

In general, one or more of elements 14 provide a direct management interface that supports a syntax in which a special indicator is used to indicate that a submitted command is not to be executed but rather translated into scripting format for presentation back to the user. For example, one or more of elements 14 are configured to receive commands in an execution format via the text-based management interface (e.g., Telnet or SSH) and, upon detecting the special indicator, to translate (or reformat) the commands to conform to an XML format and present the XML format back to the user for incorporation within a script. More particularly, elements 14 can receive a command including one or more parameters as specified for execution of the command directly by the network element. Upon detecting the special indicator within the command line, elements 14 are configured to reformat the submitted command such that the XML-formatted equivalent script specifies and the parameters in accordance with the scripting language and syntax supported by the elements. In this manner, the techniques of this disclosure may simplify the task for administrator 12 when creating XML formatted commands, e.g., during the process of generating scripts to be executed by one or more of elements 14 by allowing the administrator to easily determine the XML-equivalent of a specific command by merely submitting the command to the element in normal fashion via a command interface but including an indicator (e.g., a special XML pipe) as described herein.

More specifically, elements 14 provide a command interface for receiving a command in a format for execution, as discussed above. In accordance with the techniques of this disclosure, the command interface is configured to receive a command accompanied by an indication that, rather than executing the command, the command interface is to present an XML-equivalent of the command. In this manner, a user can enter a command in a format as if the user is intending to execute the command directly on the remote network device. However, when the user provides the indication that the command interface is to present back the XML-equivalent of the command, the command interface reformats the command into appropriate XML in a particular manner that complies with the scripting interface of the managed element such that the XML-equivalent command can be included in a script subsequently sent to and executed by one or more of elements 14.

In one example, the command interface is a command line interface by which a user enters commands at a command prompt. After entering and submitting a command (e.g., by pressing "Enter"), the command interface generally receives and executes the command. However, in accordance with the techniques of this disclosure, the command interface is further configured to determine whether the indicator not to execute the command is present, and if so, to reformat the command into an XML equivalent command. When this indicator is present, the accompanying command and any parameters to be applied to the command are reformatted to conform to XML, or other format suitable for inclusion in scripts. In some examples, the command interface is configured with a software hook that intercepts the received command when the indicator is present. The software hook prevents direct execution of the command, intercepts the command along any specified parameters to be applied during execution of the command, and invokes a process that reformats the command into an XML-equivalent command that can be submitted to elements 14 via an RPC.

The techniques of this disclosure, which may be implemented at least in part by elements 14 and management device 10, may provide several advantages. For example, the task of constructing scripts to be executed by elements 14 may be simplified in accordance with these techniques. Administrator 12 may be more familiar with entering commands into a command interface of a network element than with XML formatting constructs for similar commands. Rather than consulting a large, unwieldy document that describes corresponding XML constructs for all various commands supported by the rich management interface, administrator 12 may simply enter a particular command into the command interface of the network element followed by the indicator that the command is not to be executed. The network element, in turn, presents administrator 12 with the corresponding XML construct. Then, administrator 12 may simply copy the XML formatted command, output by the network element, into a script that administrator 12 is currently creating for management device 10. The network element constructs the XML formatted command such that any parameters to be applied during execution of the command are also included and in a manner that complies with the particular requirements of the scripting interface of the network device. This allows administrator 12 to formulate and test commands by submitting them directly for execution via the command interface of a particular element 14. Then, upon successfully formulating the command and achieving the desired results, the administrator may utilize the same interface to cause the element 14 to display the corresponding XML for that exact command.

For example, suppose each of elements 14 correspond to separate routers of enterprise network 2. Administrator 12 may log into element 14A to formulate and test commands directly via the command interface (e.g., SSH) presented by element 14A, direct element 14A to produce the XML equivalent of that same command, copy the XML equivalent command into a script, then submit the script to a scripting repository of management device for subsequent deployment to each of elements 14. As another example, element 14A may correspond to a gateway device, element 14B may correspond to a router, and element 14F may correspond to a security device (e.g., an intrusion detection and prevention device). Elements 14C may also correspond to a routing device, element 14D may correspond to a security device, and elements 14E and 14G may correspond to gateway devices. In this example, administrator 12 may log into element 14A to determine an XML equivalent command for a command specific to interacting with a gateway device, construct a gateway device script including the XML equivalent command, and then submit the gateway device script to elements 14A, 14E, and 14G. Similarly, administrator 12 may log into element 14B to determine an XML equivalent command for a command specific to interacting with a router, construct a router script, and then submit the router script to elements 14B and 14C. Likewise, administrator 12 may log into element 14F to determine an XML equivalent command for a command specific to interacting with a security device, construct a security device script including the XML equivalent command, and then submit the security device script to elements 14F and 14D.

Figure 2:
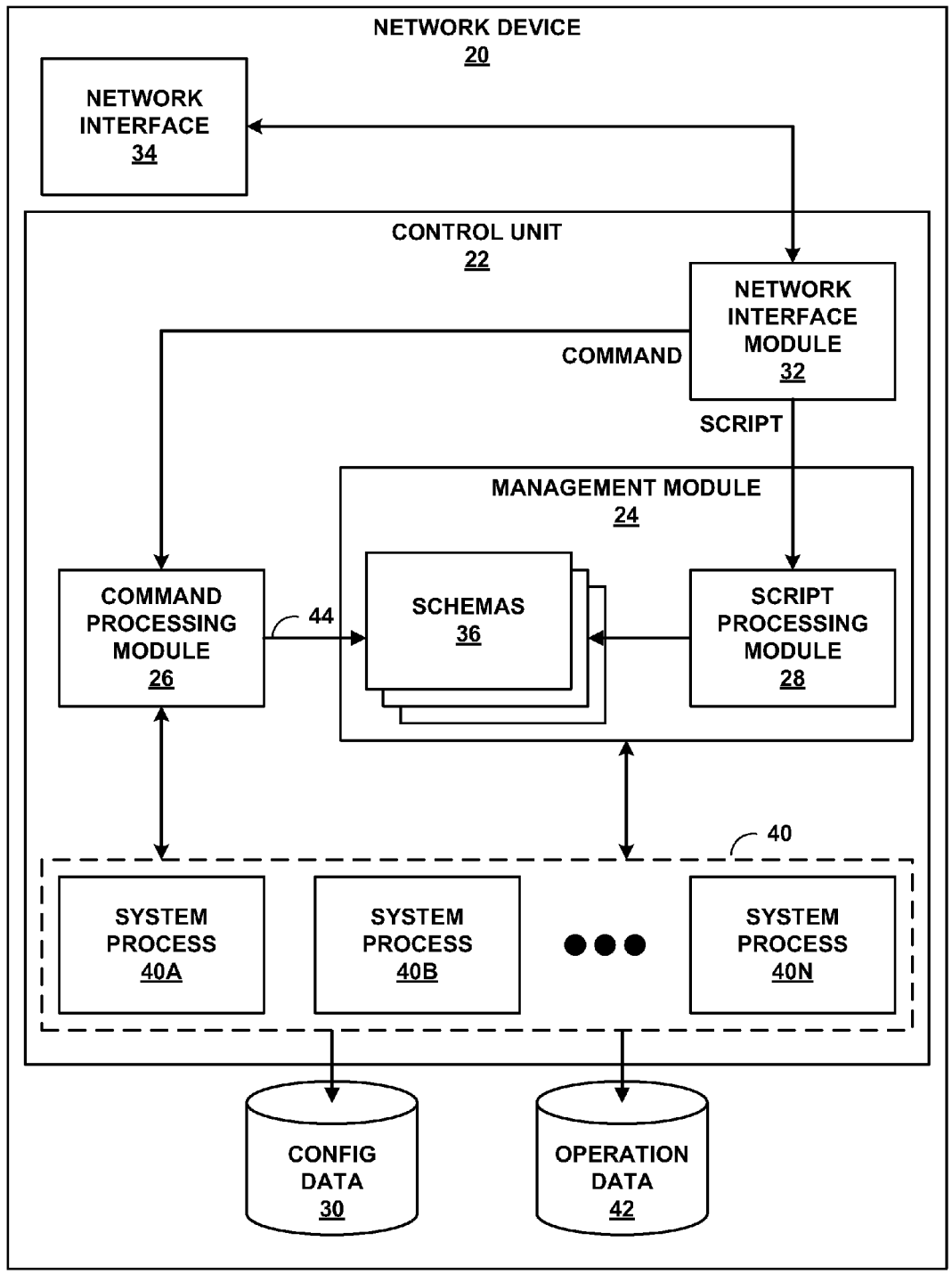
FIG. 2 is a block diagram illustrating components of an example network device.

FIG. 2 is a block diagram illustrating components of an example network device 20. Any or all of elements 14 (FIG. 1) may include components similar to those of network device 20. In this manner, network device 20 represents an example of one of elements 14 of enterprise network 2. In the example of FIG. 2, network device 20 includes control unit 22, configuration data 30, operation data 42, and network interface 34. Network interface 34 represents an example interface that can communicatively couple network device 20 to an external device, e.g., another element of an enterprise network, such as a router, switch, bridge, gateway, hub, or the like. Network interface 34 may represent a wireless and/or wired interface, e.g., an Ethernet interface or a wireless radio configured to communicate according to a wireless standard, such as one or more of the IEEE 802.11 wireless networking protocols (such as 802.11 a/b/g/n or other such wireless protocols). Network device 20 may include multiple network interfaces in various examples (e.g., when network device 20 corresponds to a router or switch), although only one network interface is illustrated for purposes of example.

Control unit 22 represents any combination of hardware, software, and/or firmware for implementing the functionality attributed to control unit 22 and its constituent modules and elements. When control unit 22 includes software or firmware, control unit 22 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components.

Configuration data 30 represents a computer-readable storage medium capable of storing configuration data for network device 20. The storage media may include, for example, random access memory (RAM), read only memory (ROM), flash memory, solid state drives, or the like. In general, management module 24 executes commands to manage or manipulate configuration data 30, although management module 24 also manages other components of network device 20, such as system processes 40A-40N (system processes 40). It should be understood that system processes 40 can be implemented as discrete hardware units or software modules. Operation data 42 represents a computer readable storage medium capable of storing data for operations performed by system processes 40.

When network device 20 corresponds to a router, for example, system process 40A may represent a routing protocol, while system process 40B may represent a chassis management process. In such an example, configuration data stores interface settings, customer-specific parameters, chassis settings and similar configuration settings. Operation data 42 may store a routing information base, a forwarding information base, state data, traffic statistics, subscriber information, filtering information and other data which is maintained and generated by a routing engine, forwarding engines, line cards, interfaces or other components of network device 20. As another example, when network device 20 corresponds to an intrusion detection and prevention device, system processes 40 may represent packet processing modules for inspecting packets with respect to network intrusion signatures, virus signatures, or to otherwise determine whether one or more packets represent malicious network activity. In this example, operation data 42 stores the signatures for detecting malicious network activity. As still another example, network device 20 may include multiple chassis (e.g., a switch card chassis and a line card chassis), in which case one or more of system processes 40 may be configured to perform chassis management.

Network interface module 32 implements one or more protocols for receiving commands directly from a user, e.g., telnet, SSH, or the like. In this manner, administrator 12 may remotely log into network device 20 via management device 10 and interact with network device 20 as if administrator 12 were sitting before network device 20. In such examples, command processing module 26 presents a command interface, such as a command line interface, by which administrator 12 submits commands directly to network device 20. Command processing module 26 interprets these commands and causes control unit 22 to execute the commands.

Network device 20, in some examples, includes two modes of operation: a configuration mode for modifying configuration data 30 and an operation mode for performing regular operations and retrieving statistics and data from network device 20. In general, command processing module 26 receives operational commands from administrator 12 while network device 20 is in operation mode. Typical commands in operation mode allow the administrator to view statistics and other data collected by network device 20 within operation data 42 or to initiate certain processes, such as a software upgrade. Administrator 12 may also input a particular command, e.g., "config" to place network device into configuration mode in which network device 20 supports additional commands for specifying configuration data for the device and, thereby, modifying configuration data 30.

Management module 24 provides a scripting interface for execution of automated scripts and similarly supports the two modes of execution. Script processing module 28 receives scripts via network interface module 32, which in this example are formatted according to XML. Script processing module 28 may also be referred to as a scripting interface or a scripting engine. Generally, network device 20 receives the scripts from management device 10 and the scripts may include operational commands as well configuration commands as supported by the network device. Execution of the scripts may cause management module 24, for example, to access or update operation date 42 or configuration data 30.

In the example of FIG. 2, management module 24 includes script processing module 28 and schemas 36. Schemas 36 generally correspond to XML schemas (e.g., .xsd documents) for that specify the format and structure for specific XML-based commands that can be processed by script processing module 28. Schemas 36 generally describe constraints for XML statements, e.g., a format and order of elements. In this manner, schemas 36 describe a grammar (e.g., a context free grammar) for XML statements that can be executed by script processing module 28 of management module 24. In this sense, schemas 36 describe one or more of grammatical rules governing an order of elements, Boolean predicates that content must satisfy, data types governing content of elements and attributes (that is, parameters), and other rules for XML statements. Script processing module 28 refers to schemas 36 to interpret received XML scripts, such as XML-formatted remote procedure calls, received via network interface module 32.

In accordance with this disclosure, command processing module 26 is configured to receive commands as described above, as well as commands accompanied by a request to display a reformatted version of the command. For example, administrator 12 may initiate a remote session with network device 20 via management device 10 and submit a command accompanied by an indication that the command is not to be executed. In some examples, the syntax for the indication may resemble a pipe '|' followed by a second command, e.g., "display XML rpc." While the syntax of this indication may resemble a pipe to aid the user's understanding and use of the mechanism, such as that used in a UNIX environment, the behavior of command processing module 26 is defined differently than a UNIX-like pipe.

As an example, when command processing module 26 receives a command (which may include one or more parameters) followed by "|display xml rpc," command processing module 26 translates the command into an XML equivalent format without executing the command. In some examples, command processing module 26 parses and tokenizes a command in the same manner, whether the command is to be executed or reformatted, and determines whether to execute the command based on whether a new line or carriage return character follows the command (including parameters to apply to the command), or whether the indication (such as the pipe discussed above) follows the command. In some examples, command processing module 26 includes a software hook that intercepts the command prior to execution and redirects elements of the command (e.g., the command name and one or more parameters to be applied during execution of the command) to a translation (or reformatting) process of command processing module 26.

In the example of FIG. 2, to produce XML formatted equivalent expressions for received commands, command processing module 26 may inspect schemas 36 (44). Command processing module 26 parses a received command, including one or more parameters to be applied during execution of the command, to build an execution data structure (e.g., an execution tree). Then, command processing module 26 uses schemas 36 to determine an equivalent XML command for the execution data structure. In this manner, command processing module 26 can leverage an existing set of XML schemas, conventionally used by script processing module 28 when processing scripts, to compute an equivalent XML script for a command received via a direct, command line interface.

Figure 3:
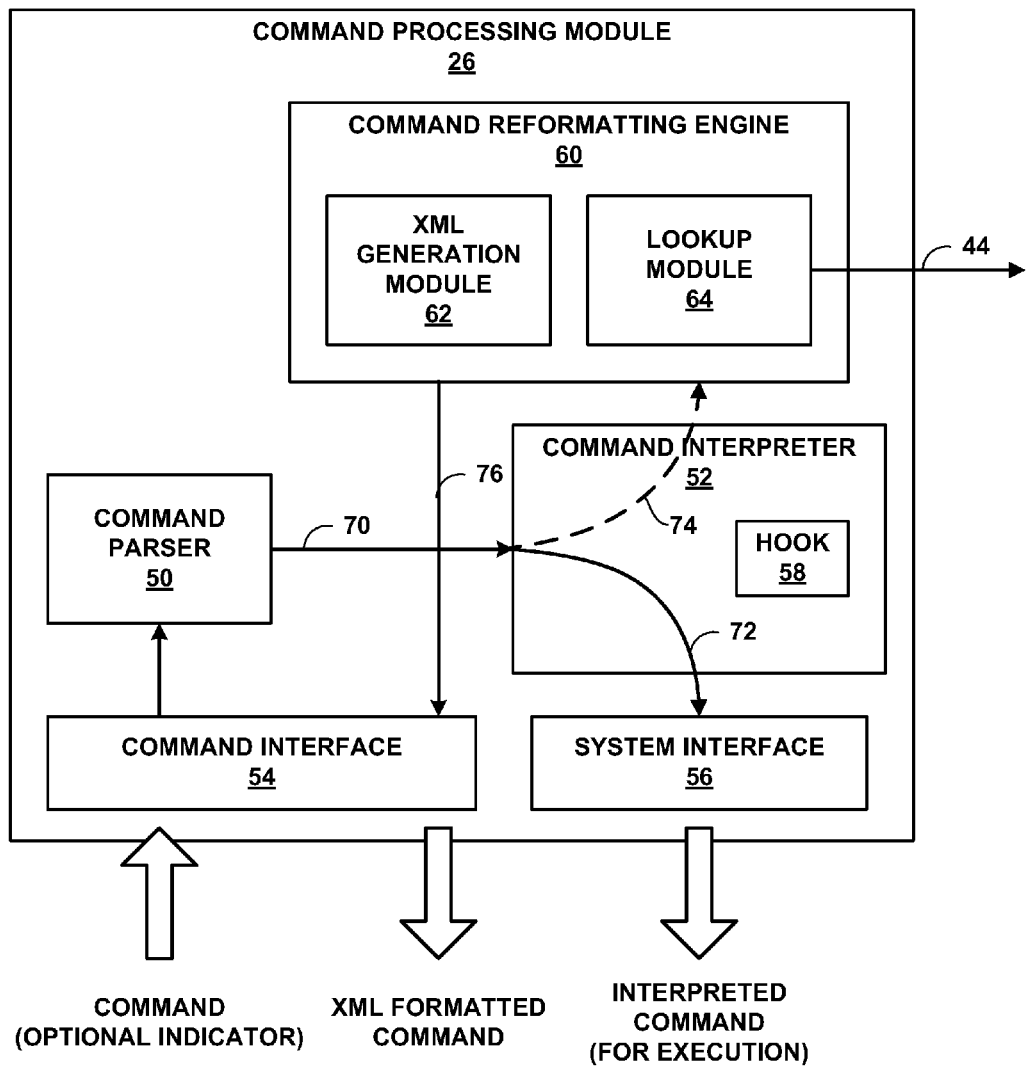
FIG. 3 is a block diagram illustrating an example set of components of a command processing module.

Alternatively, command processing module 26 may access a stored library of data that specifies XML equivalents for commands supported by command processing module 26. Although the examples of FIGS. 2 and 3 illustrate the use of schemas 36 to determine the appropriate XML structure to use to translate (or reformat) a received command in an execution format, it should be understood that the use of schemas 36 is not necessary. Instead, a corresponding XML structure for each command may be specified within the library, such that command processing module 26 is able to use the provided XML structure to translate a received command in execution format into an XML script. This data may be stored with, e.g., configuration data 30, operational data 42, or in a separate data storage of network device 20. Moreover, this data may be stored in a separate network device, in other examples.

Schemas 36 generally define an XML format for various commands that can be interpreted by script processing module 28, as well as parameters that can be applied for each of the commands. Accordingly, when script processing module 28 receives a script to be interpreted, script processing module determines semantics for each syntactic element received in the script using schemas 36. Moreover, as discussed in greater detail below, command processing module 26 can use schemas 36 to determine an XML equivalent to a received command, when the command is accompanied by an indication that the command is to be reformatted (or translated) rather than executed.

As noted above, command processing module 26 is capable of receiving commands when network device 20 is in operation mode, as well as in configuration mode. In accordance with the techniques of this disclosure, command processing module 26 can receive a command accompanied by the indication that the command is not to be executed, but rather to be reformatted (or translated), while in operation mode. In this manner, the techniques of this disclosure can be utilized without taking network device 20 out of operation mode.

As discussed above, command processing module 26 is configured to receive a wide variety of commands in both operation mode and configuration mode. As one example, command processing module 26 may be configured to execute a "show" command that is generally used to display (or otherwise output) data associated with a particular process or aspect of network device 20. For example, administrator 12 may use the "show" command to display details of data for the open shortest path first (OSPF) process when network device 20 corresponds to a router, e.g., by entering "show ospf neighbor area 1 interface ge-0/0/0." In this case, 'show' represents the show command and "ospf neighbor area 1 interface ge-0/0/0" represent parameters to be applied to the show command during execution. In this example, the show command is passed parameters related to OSPF, including a neighbor area of 0.0.0.1 for interface ge-0/0/0 of network device 20.

In addition, administrator 12 may enter "|display xml rpc" following the example show command above to instruct command processing module 26 to translate the show command into an XML equivalent script. That is, administrator 12 may enter "show ospf neighbor area 1 interface ge-0/0/0|display xml rpc" to determine an XML equivalent command. In this example, command processing module 26 may translate the example show command to the following XML equivalent command:

```
<rpc-reply xmlns:junos="http://xml.juniper.net/junos/10.1I0/junos">
    <rpc>
        <get-ospf-neighbor-information>
            <interface>ge-0/0/0</interface>
            <area>0.0.0.1</area>
        </get-ospf-neighbor-information>
    </rpc>
    <cli>
        <banner></banner>
    </cli>
</rpc-reply>
```

Other uses of the "show" command include showing chassis hardware for network device 20, in which case control unit 22 outputs details for hardware of network device 20 in response to the command. For example, administrator 12 may enter "show chassis hardware," and in response, control unit 22 may output details of the hardware of network device 20.

Moreover, in accordance with the techniques of this disclosure, administrator 12 may enter "show chassis hardware display xml rpc" to translate the command "show chassis hardware" into an XML equivalent script. In this example, command processing module 26 may translate the "show chassis hardware" command into the following XML equivalent script:

```
<rpc-reply xmlns:junos="http://xml.juniper.net/junos/5.6R1/junos">
    <chassis-inventory xmlns="http://xml.juniper.net/junos/5.6R1/junos-
        chassis">
    <chassis junos:style="inventory">
    <name>Chassis</name>
    <serial-number>00118</serial-number>
    <description>M40</description>
    <chassis-module>
    <name>Backplane</name>
    <version>REV 06</version>
    <part-number>710-000073</part-number>
    <serial-number>AA2049</serial-number>
    </chassis-module>
    <chassis-module>
    <name>Power Supply A</name>
    ...
    </chassis-module>
    ...
    </chassis>
    </chassis-inventory>
</rpc-reply>
```

Other uses of the show command include showing details for border gateway protocol neighbors ("show bgp neighbor"), chassis information, chassis cluster information, interface information, security information, system service information, or other details of network device 20, such as data for processes executed by or hardware of network device 20.

Another command that command processing module 26 can execute is a clear command, which can be used to clear software processes on network device 20. Clear commands are generally used in gateway devices and routers to clear processes executed by those devices. For example, administrator 12 may use the clear command to clear data for chassis cluster processes, security processes, networking processes, or other processes. For example, to clear data associated with a media access control (MAC) table associated with a virtual local area network (VLAN) of an instance of a virtual private local area network service (VPLS), administrator 12 may enter "clear vpls mac-table vlan-id 1 instance 1."

Moreover, in accordance with the techniques of this disclosure, administrator 12 may enter "clear vpls mac-table vlan-id 1 instance 1|display xml rpc" to cause command processing module 26 not to execute the clear command, but instead to display an XML equivalent script for "clear vpls mac-table vlan-id 1 instance 1." In this example, command processing module 26 translates the example clear command to:

```
<rpc-reply xmlns:junos="http://xml.juniper.net/junos/10.1I0/junos">
    <rpc>
        <clear-vpls-mac-table>
            <instance>1</instance>
            <vlan-id>1</vlan-id>
        </clear-vpls-mac-table>
    </rpc>
    <cli>
        <banner></banner>
    </cli>
</rpc-reply>
```

Other commands that can be executed by command processing unit 26 include request commands that can be used to stop or reboot device components, switch between primary and backup components, display messages, and display information. Another type of command that can be executed is a restart command that restarts software processes executing on network device 20, e.g., one of system processes 40. Other commands can also be executed, which may be specific to the type of network device in question.

Furthermore, the piped command "display xml rpc" can further be piped to a "display detail" command. Command processing module 26 displays additional details for the command, e.g., explanations of how the command works or effects of the command, default parameters for the command, types for parameters of the command, or other information that is determined to be useful to a user of the command, e.g., administrator 12. For example, if administrator 12 entered "clear vpls mac-table vlan-id 1 instance 1|display xml rpc|display detail," command processing module 26 may output, in addition to the XML code above:

```
<clear-vpls-mac-table>
    <junos:comment>## Display information for a specified
        vpls</junos:comment>
    <junos:comment>## type: string</junos:comment>
    <junos:comment>## path-reference: routing-instances
        <*></junos:comment>
    <junos:comment>## default: "all"</junos:comment>
    <instance>instance</instance>
    <vlan-id>1</vlan-id>
</clear-vpls-mac-table>
```

FIG. 3 is a block diagram illustrating an example set of components of command processing module 26 of FIG. 2. In this example, command processing module 26 includes command reformatting engine 60, command parser 50, command interpreter 52, command interface 54, and system interface 56. Command interface 54 may correspond to a command line interface or a graphical user interface by which command processing module 26 receives a command, along with parameters to be applied during execution of the command. In accordance with the techniques of this disclosure, the command may be accompanied by an indication that the command is not to be executed, but instead is to be reformatted into XML for display. In this manner, when the command is accompanied by the indication, command processing module 26 forms a reformatted (or translated) version of the command, represented in XML, which a user may include in a script.

Command parser 50 receives a command, which may be accompanied by the indicator, via command interface 54. In some examples, command parser 50 is configured with a context free grammar that defines one or more commands that can be executed by control unit 22 of network device 20, as well as positions of parameters that can be applied during execution of the command. In some examples, command parser 50 corresponds to a recursive descent parser configured according to the context free grammar, and further includes a tokenizer that tokenizes the input text into a list of tokens that are then parsed. In accordance with the techniques of this disclosure, the context free grammar also defines the possibility of receiving an indicator that the command is not to be executed, but is instead to be reformatted. In one example, the first element in the context free grammar is:

<input>→<command> {|display xml rpc {|display details}}.

In this example, <input> corresponds to a line of input received by command interface 54, where command interface 54 corresponds to a command line interface. The line of input corresponds to a string of characters terminated by a new line or carriage return character. Upon detecting the new line character (or carriage return character), command interface 54 passes the line of input to command parser 50. The arrow '→' indicates that the <input> can include a <command> element, possibly followed by a "|display xml rpc" element and a "|display details" element. Curly braces '{' and '}' represent that an element is optional.

The <command> element in the context free grammar entry above represents the name of a command, e.g., "show," "clear," "request," "restart," or the like. Thus, another entry of the context free grammar may be:

<command>→show <show_param_list>|clear <clear_param_list>|request <request_param_list>|restart <restart_param_list> . . .

In this example, each command has an associated parameter list. The parameters for a particular command may differ based on the command, and therefore, the parameter lists may be defined separately for each command. In some examples, all commands share the same possible parameter list, in which case a common <param_list> element may be used, e.g., in the first entry of the context free grammar. In this example entry, the horizontal bars '|' are intended to represent separations between entries rather than pipes as discussed above.

The "|display xml rpc" element of the first entry of the grammar discussed above is an example of an indication that the command accompanied by this indication is not to be executed. As shown, the "|display xml rpc" element is placed between curly braces, to indicate that its presence is optional. Likewise, the "|display details" element is shown within a nested set of curly braces to indicate that "|display details" may further accompany the "|display xml rpc" element, but does not generally accompany the command without "|display xml rpc."

Command parser 50 parses a line of input received from command interface 54 and passes the parsed input 70 to command interpreter 52. The parsed input 70, in some examples, corresponds to a data structure including the <command> portion of the input, as well as any parameters associated with the command (e.g., <show_param_list> for the show command, <clear_param_list> for the clear command, and the like). Command interpreter 52 includes a software hook 58 that intercepts the <command> portion of the input received by command interface 54 when the input includes the indication that the command is not to be executed (where the indication is "|display xml rpc" in this example).

When the command is not accompanied by the indication that the command is not to be executed, command interpreter 52 forms an execution structure from parsed input 70. That is, command interpreter 52 translates parsed input 70 into native instructions 72 for a processing unit of control unit 22. Processors, for example, include a set of instructions that can be executed, such as "add," "shift," "jump" and the like. The processing unit of control unit 22 may comprise a processor having a reduced instruction set computer (RISC) architecture, a complex instruction set computer (CISC) architecture, a minimal instruction set computer (MISC), or the like. Command interpreter 52 translates parsed input 70 into an interpreted command, including native instructions 72, and passes native instructions 72 to the processing unit of control unit 22 via system interface 56, when the command is not accompanied by the indication that the command is not to be executed. The interpreted command also includes values to be applied during execution of native instructions 72, based on the parameter list (including one or more parameters) received with the command.

When parsed input 70 includes the indication that the command is not to be executed, hook 58 intercepts the command (that is, parsed input 70) and directs parsed input 70 to command reformatting engine 60, along with an indication of whether to show details for elements of the command (collectively, parsed input 74). Command reformatting engine 60 receives parsed input 74 and translates parsed input 74 into an equivalent XML structure that can be included in a script that can be executed by, e.g., script processing module 28 (FIG. 2). In the example of FIG. 3, command reformatting engine 60 includes XML generation module 62 and lookup module 64. Lookup module 64 issues queries 44 to schemas 36 to determine XML tags and formatting for commands and parameters included in parsed input 74. As noted with respect to FIG. 2, schemas 36 describe the syntax for XML scripts, as well as corresponding semantics for the various syntax elements.

Accordingly, XML generation module 62 creates a corresponding XML script for elements of parsed input 74. When parsed input 74 includes an indication that details for the script are requested (e.g., when the <command> portion of the input is accompanied by "|display details"), lookup module 64 further retrieves details (XML comments, in this example) from schemas 36. Schemas 36 include descriptions of the commands, such as possible parameters that can accompany a command, data types for the parameters, and a description of the output resulting from the command and the parameters. In this manner, XML generation module 62 forms an XML script corresponding to received input when the input includes a command accompanied by an indication that the command is not to be executed.

The XML script also includes tags having values for parameters received with the command. That is, XML generation module 62 uses data of schemas 36, retrieved by lookup module 64, to determine proper syntactic positioning (e.g., nested position, indenting, and the like) of the parameters received with the command. Moreover, XML generation module 62 inserts values for the parameters into the proper position (e.g., nested between tags for the parameter) based on values for the parameters received by command interface 54 (and included in parsed input 74). It should be understood that each command may be associated with a variety of possible parameters, as indicated by schemas 36. However, only a small subset of the possible parameters is typically included with a given command. By using data of schemas 36, XML generation module 62 can construct an XML script having only data for the parameters of the input received by command interface 54 (and likewise, filling in values for these parameters based on the received input), and exclude other possible parameters from the constructed XML script. In this manner, XML generation module 62 constructs an XML script that is the functional equivalent of the command included in the input received by command interface 54. Command reformatting engine 60 provides the constructed XML script 76 back to command interface 54, which sends the XML formatted command back to the user, e.g., by displaying the XML formatted command on the graphical user interface or command line interface.

Figure 4:
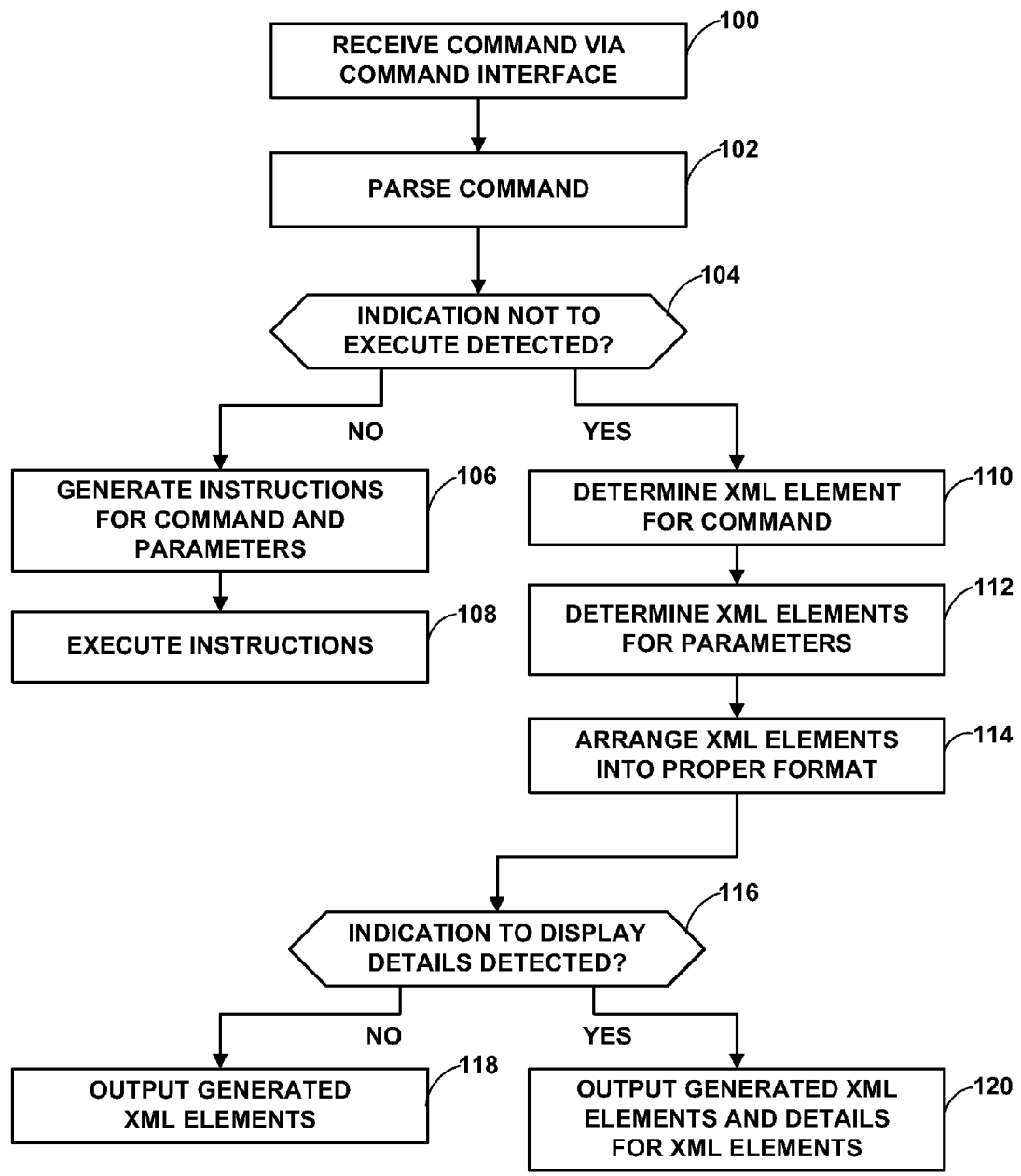
FIG. 4 is a flowchart illustrating an example method for translating a command into an XML equivalent command.

FIG. 4 is a flowchart illustrating an example method for translating a command into an XML equivalent command. The example method of FIG. 4 is described as being performed by the example components of control unit 22 in FIGS. 2 and 3. However, it should be understood that other devices and processing units can be configured to perform this method, without departing from the techniques of this disclosure. For example, management device 10 (FIG. 1) may be configured with an emulator for the command interface of network device 20 (e.g., one of elements 14 of FIG. 1), such that management device 10 can be used to translate a command in a format for execution into an XML format that can be included in a script for a remote procedure call.

Initially, network device 20 receives a command via command interface 54 (100). Command interface 54 typically receives such a command after administrator 12 initiates a network session (e.g., one of sessions 16 of FIG. 1) with network device 20, such as in accordance with telnet or SSH. Network device 20 then displays command interface 54, such as a command line interface, by which administrator 12 enters commands for execution by network device 20. Moreover, in accordance with the techniques of this disclosure, administrator 12 can also enter commands accompanied by indications that the commands are not to be executed, but rather to be translated into XML equivalents.

After receiving the command, command interface 54 provides the command to command parser 50, causing command parser 50 to parse the command (102). Command interface 54 generally recognizes an end of the command when a new line or carriage return character is entered (e.g., after administrator 12 presses the "ENTER" key on a keyboard). Command parser 50 parses the command in accordance with the context free grammar according to which command parser 50 is configured. Generally, command parser 50 determines tokens for the received input corresponding to a name of a command and one or more parameters to be applied during execution of the command. Command parser 50 is further configured, in accordance with the techniques of this disclosure, to determine whether the command is followed by an indication that the command is not to be executed, but rather, is to be translated into an XML equivalent command (104).

When the indication that the command is not to be executed is not detected (that is, when there is no such indication) ("NO" branch of 104), control unit 22 generally executes the command normally. That is, command parser 50 parses the command and passes parsed input 70 to command interpreter 52. Command interpreter 52, in turn, interprets the command to form native instructions 72 (106) that can be executed by control unit 22 when the indication is not present, and then submits native instructions 72 to control unit 22 for execution via system interface 56, causing control unit 22 to execute native instructions 72 (108).

On the other hand, when the indication not to execute the command is detected ("YES" branch of 104), hook 58 intercepts the parsed input and redirects the parsed input 74 to command reformatting engine 60. After receiving parsed input 74, command reformatting engine 60 determines an XML element for the command (110). In this example, lookup module 64 issues query 44 to schemas 36 to determine an XML command name for the command of parsed input 74. Likewise, command reformatting engine 60 determines XML elements for parameters of the command as well (112), again issuing queries 44 to schemas 36 to make these determinations. Based on the data of schemas 36, XML generation module 62 arranges the XML tags that are equivalent to the command element and the parameter elements, e.g., indenting the parameter elements properly relative to the command element, placing the parameter elements in order, and applying values for the parameter elements as received in parsed input 74.

In some cases, administrator 12 further includes a request for details on the XML script, e.g., by adding "|display details" following the "|display xml rpc" indication. Accordingly, command interpreter 52 determines whether parsed input 70 includes a request to display details, and if so, includes an indication that details are requested in parsed input 74. Likewise, command reformatting engine 60 determines whether the indication to display details is present in parsed input 74 (116). If parsed input 74 includes this indication to display details ("YES" branch of 116), lookup module 64 retrieves XML comments that describe the details of the command and its parameters from schema 36 using queries 44, and XML generation module 62 includes these XML comments in the generated XML equivalent command, outputting the XML equivalent command 76 including the XML comments describing details for the XML elements, e.g., the XML command and XML parameters (120). On the other hand, when parsed input 74 does not include the indication requesting details ("NO" branch of 116), XML generation module 62 simply outputs the translated XML equivalent command. In either case, XML generation module 62 outputs the translated XML command to administrator 12 via command interface 54.

Figure 5:
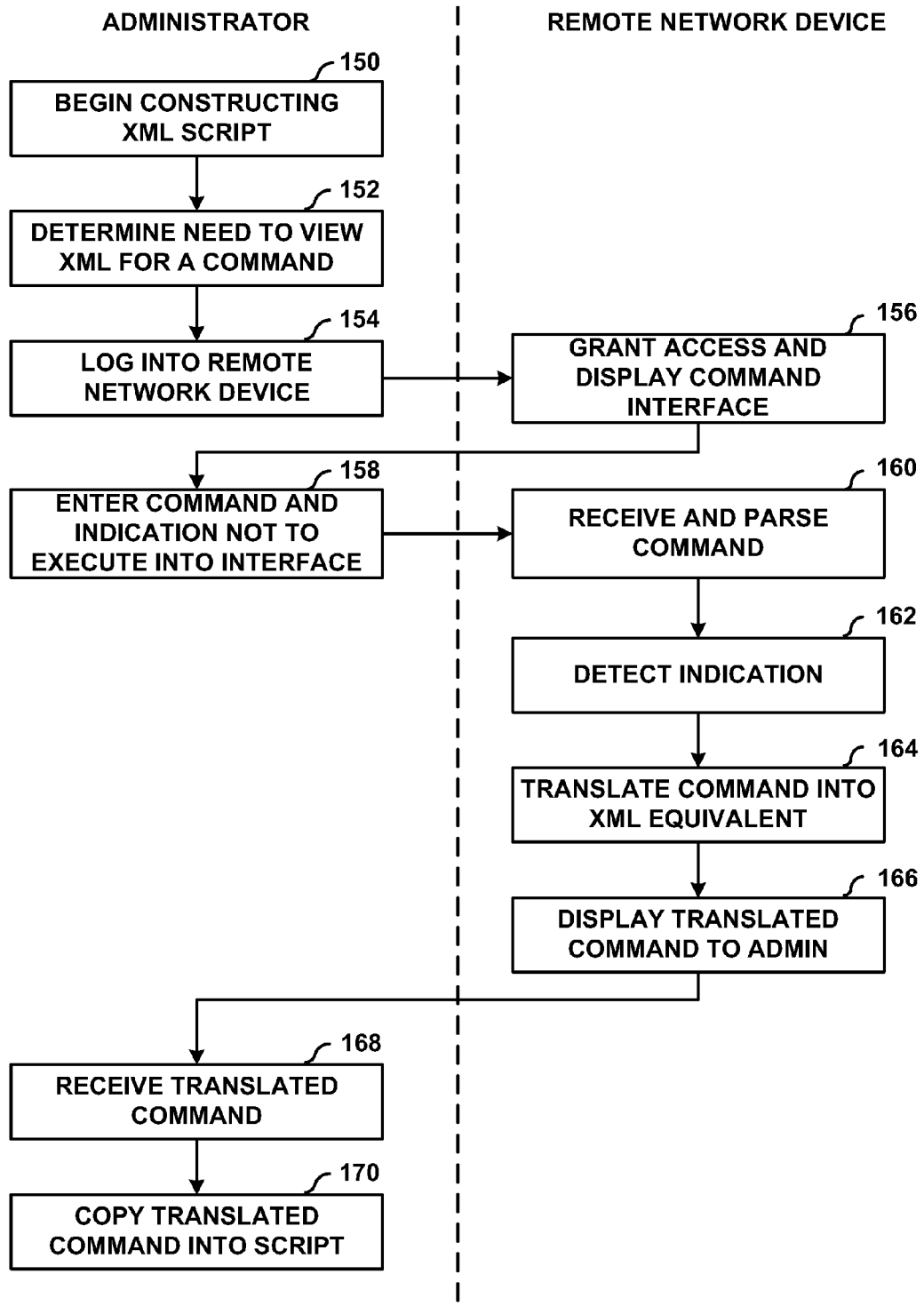
FIG. 5 is a flowchart illustrating an example method for using the techniques of this disclosure to construct a script to be submitted to a remote network device.

FIG. 5 is a flowchart illustrating an example method for using the techniques of this disclosure to construct a script to be submitted to a remote network device. In this example, administrator 12 begins the process of constructing an XML script (150), which may include one or more commands to be executed by a remote network device, such as one or more of elements 14 (FIG. 1). Administrator 12 constructs such XML scripts such that administrator 12 does not need to individually log into each of elements 14, but can instead deploy the XML script to elements 14.

Administrator 12 can generally construct the script based on existing knowledge of XML syntax and semantics for various commands to be executed by elements 14. In this example, however, administrator 12 determines that the XML statement for a particular command is unknown, and thus, administrator 12 needs to look up the equivalent XML for a particular command (152). Rather than consulting a technical document, however, administrator 12 logs into a remote network device, such as one of elements 14 (154). For example, administrator 12 may initiate a telnet or SSH with the remote network device. In response, the remote network device grants administrator 12 access and displays a command interface, such as a command line interface (e.g., corresponding to command interface 54 of FIG. 3) (156).

Administrator 12 then enters a command, along with parameters to be applied during execution of the command, and, in accordance with the techniques of this disclosure, an indication that the command is not to be executed at this time into the interface presented by the remote network device (158). Assuming administrator 12 logs into the remote network device via management device 10, administrator 12 physically enters the input into a hardware interface of management device 10, which then provides the input to the command interface presented by the remote network device via the telnet or SSH session initiated by administrator 12.

In any case, the remote network device receives and parses the command from administrator 12 (160). In this example, because administrator 12 entered the indication not to execute the command at this time, the remote network device detects the indication that the command is not to be executed (162). Accordingly, the remote network device then translates the received command into an XML equivalent command (164). The remote network device then displays the translated XML equivalent command to administrator 12 (166). That is, the remote network device outputs the XML equivalent command via the telnet or SSH session back to management device 10, causing a display device of management device 10 to display the XML equivalent command.

In this manner, administrator 12 can receive the translated command from the remote network device (168). Accordingly, administrator 12 may copy the translated command into the script that administrator 12 is constructing (170). It should be understood, of course, that if the XML command were to be executed multiple times with similar parameters (albeit with different values for the parameters), administrator 12 could simply change values for the parameters in the received XML command, without the necessity of submitting additional commands to the remote network device with the varied parameter values. In this manner, the techniques of this disclosure may simplify the process of creating an XML script by administrator 12, in that administrator 12 may rely simply on knowledge of commands for a command line interface of a remote network device to construct XML scripts to be executed by the remote network device and/or similar remote network devices. In some examples, after forming the script, administrator 12 may submit the script to one or more of, e.g., elements 14 for execution. The script may include a portion that is identical to, or at least substantially similar to, the translated command.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

The invention claimed is:

1. A method comprising:
receiving, via a command interface of a network device, input comprising a command and an indicator, wherein the command conforms to an execution format and specifies one or more parameters to be applied during execution of the command, wherein the indicator indicates, at least in part, that the command is not to be executed by the network device, wherein receiving the input comprises receiving a text string, and wherein the text string comprises a first portion corresponding to the command and the one or more parameters and a second portion corresponding to the indicator;
based on the indicator, reformatting, by the network device, the command to conform to an extensible markup language (XML) format such that the reformatted command complies with a syntax supported by a script processing module of the network device and specifies the command and the one or more parameters in the XML format in a format that can be executed by the script processing module; and
based on the indicator, outputting the reformatted command without executing the command.

2. The method of claim 1, wherein the second portion corresponding to the indicator comprises a pipe symbol '|' followed by at least a keyword of "display" in the text string.

3. The method of claim 1, wherein receiving the input comprises receiving the input via a command line interface, and wherein outputting the reformatted command comprises outputting the reformatted command via the command line interface.

4. The method of claim 1, further comprising intercepting, by a software hook executed by the network device, the command based on the indicator.

5. The method of claim 1, wherein the indicator comprises a first indicator, wherein the input comprises a second indicator indicating that extra details are to be included with the reformatted command, and wherein reformatting the command comprises including the extra details with the reformatted command based on the second indicator.

6. The method of claim 5, wherein the second indicator comprises a text string comprising "|display details."

7. The method of claim 1, further comprising:
receiving, by the script processing module, an XML script including a portion substantially similar to the reformatted command; and
executing, by the script processing module, the received XML script.

8. The method of claim 1, wherein reformatting the command comprises reformatting the command to conform to one of a Netconf command and a Junoscript command.

9. The method of claim 1, wherein the command comprises one of a show command, a clear command, a restart command, and a request command.

10. A device comprising:
a network interface configured to present a command interface to receive input comprising a command and an indicator, wherein the command conforms to an execution format and specifies one or more parameters to be applied during execution of the command, wherein the indicator indicates, at least in part, that the command is not to be executed, wherein the input comprises a text string, wherein the text string comprises a first portion corresponding to the command and the one or more parameters and a second portion corresponding to the indicator; and a control unit configured to reformat, based on the indicator, the command to conform to an extensible markup language (XML) format such that the reformatted command complies with a syntax supported by a script processing module of the network device and specifies the command and the one or more parameters in the XML format in a format that can be executed by the script processing module, and to output, based on the indicator, the reformatted command via the command interface without executing the command.

11. The device of claim 10, wherein the control unit is configured to execute a software hook to intercept the command based on the indicator.

12. The device of claim 10, wherein the indicator comprises a first indicator, wherein the input comprises a second indicator indicating that extra details are to be included with the reformatted command, and wherein reformatting the command comprises including the extra details with the reformatted command based on the second indicator.

13. The device of claim 10, wherein the control unit is configured to receive an XML script including a portion substantially similar to the reformatted command, and to execute the received XML script.

14. A computer-readable storage medium comprising instructions that, when executed, cause a processor to:
receive, via a command interface executed by the processor, input comprising a command and an indicator, wherein the command conforms to an execution format and specifies one or more parameters to be applied during execution of the command, wherein the indicator indicates, at least in part, that the command is not to be executed, wherein the instructions that cause the processor to receive the input comprise instructions that cause the processor to receive a text string, and wherein the text string comprises a first portion corresponding to the command and the one or more parameters and a second portion corresponding to the indicator;
based on the indicator, reformat the command to conform to an extensible markup language (XML) format such that the reformatted command complies with a syntax supported by a script processing module of the network device and specifies the command and the one or more parameters in the XML format in a format that can be executed by the script processing module; and
based on the indicator, output the reformatted command without executing the command.

15. The computer-readable storage medium of claim 14, wherein the instructions that cause the processor to receive the input comprise instructions that cause the processor to receive the input via a command line interface, and wherein the instructions that cause the processor to output the reformatted command comprise instructions that cause the processor to output the reformatted command via the command line interface.

16. The computer-readable storage medium of claim 14, further comprising instructions that cause the processor to:
execute a software hook; and
intercept, by the software hook, the command based on the indicator.

17. The computer-readable storage medium of claim 14, wherein the indicator comprises a first indicator, wherein the input comprises a second indicator indicating that extra details are to be included with the reformatted command, and wherein the instructions that cause the processor to reformat the command comprise instructions that cause the processor to include the extra details with the reformatted command based on the second indicator.

18. The computer-readable storage medium of claim 14, further comprising instructions that cause the processor to:
receive an XML script including a portion substantially similar to the reformatted command; and
execute the received XML script.

19. A system comprising:
a plurality of network elements; and
a management device configured to manage each of the plurality of network elements,
wherein each of the plurality of network elements comprises:
a network interface configured to present a command interface to receive, from the management device, input comprising a command and an indicator, wherein the command conforms to an execution format and specifies one or more parameters to be applied during execution of the command, wherein the indicator indicates, at least in part, that the command is not to be executed, wherein the input comprises a text string, and wherein the text string comprises a first portion corresponding to the command and the one or more parameters and a second portion corresponding to the indicator; and
a control unit configured to reformat, based on the indicator, the command to conform to an extensible markup language (XML) format such that the reformatted command complies with a syntax supported by a script processing module of the network device and specifies the command and the one or more parameters in the XML format in a format that can be executed by the script processing module, and to output, based on the indicator, the reformatted command via the command interface without executing the command.

20. The system of claim 19, wherein the management device is configured to construct a script comprising a portion substantially similar to the reformatted command and to submit the script to each of the plurality of network elements.

* * * * *